United States Patent [19]
Cameron et al.

[11] 3,797,332
[45] Mar. 19, 1974

[54] HYDRODYNAMIC TRANSMISSION

[75] Inventors: Dugald Cameron, Taylor; Robert A. Hoetger, St. Clair Shores; Ervin R. Miller, Detroit, all of Mich.

[73] Assignee: Chrysler Corporation, Highland Park, Mich.

[22] Filed: May 3, 1972

[21] Appl. No.: 249,838

[52] U.S. Cl. .................................. 74/763, 74/781
[51] Int. Cl. ..................... F16h 57/10, F16h 3/44
[58] Field of Search ..................... 74/763, 759, 781

[56] References Cited
UNITED STATES PATENTS

| | | | |
|---|---|---|---|
| 2,518,824 | 8/1950 | Simpson | 74/763 |
| 2,651,950 | 9/1953 | Schou | 74/759 |
| 2,890,601 | 6/1959 | Forster | 74/759 X |
| 2,970,497 | 2/1961 | Foerster | 74/759 X |
| 3,035,457 | 5/1962 | Cartwright | 74/763 X |
| 3,147,643 | 9/1964 | Christenson et al. | 74/759 |
| 3,182,528 | 5/1965 | Lamburn | 74/781 R X |
| 3,319,491 | 5/1967 | Simpson | 74/759 X |
| 3,477,313 | 11/1969 | Ringe | 74/781 R |
| 3,523,468 | 8/1970 | Kepner | 74/759 |
| 3,706,240 | 12/1972 | Borneman et al. | 74/763 X |

Primary Examiner—Allan D. Herrmann
Assistant Examiner—P. S. Lall

[57] ABSTRACT

Four forward speed and reverse transmission having three planetary gear sets, four clutches, and two brake bands, certain components of which are substantially identical. The housing for the transmission is in two sections with the rear section containing two clutches and one planetary gear set. The forward housing section contains two clutches, two planetary gear sets and two brake bands.

2 Claims, 4 Drawing Figures

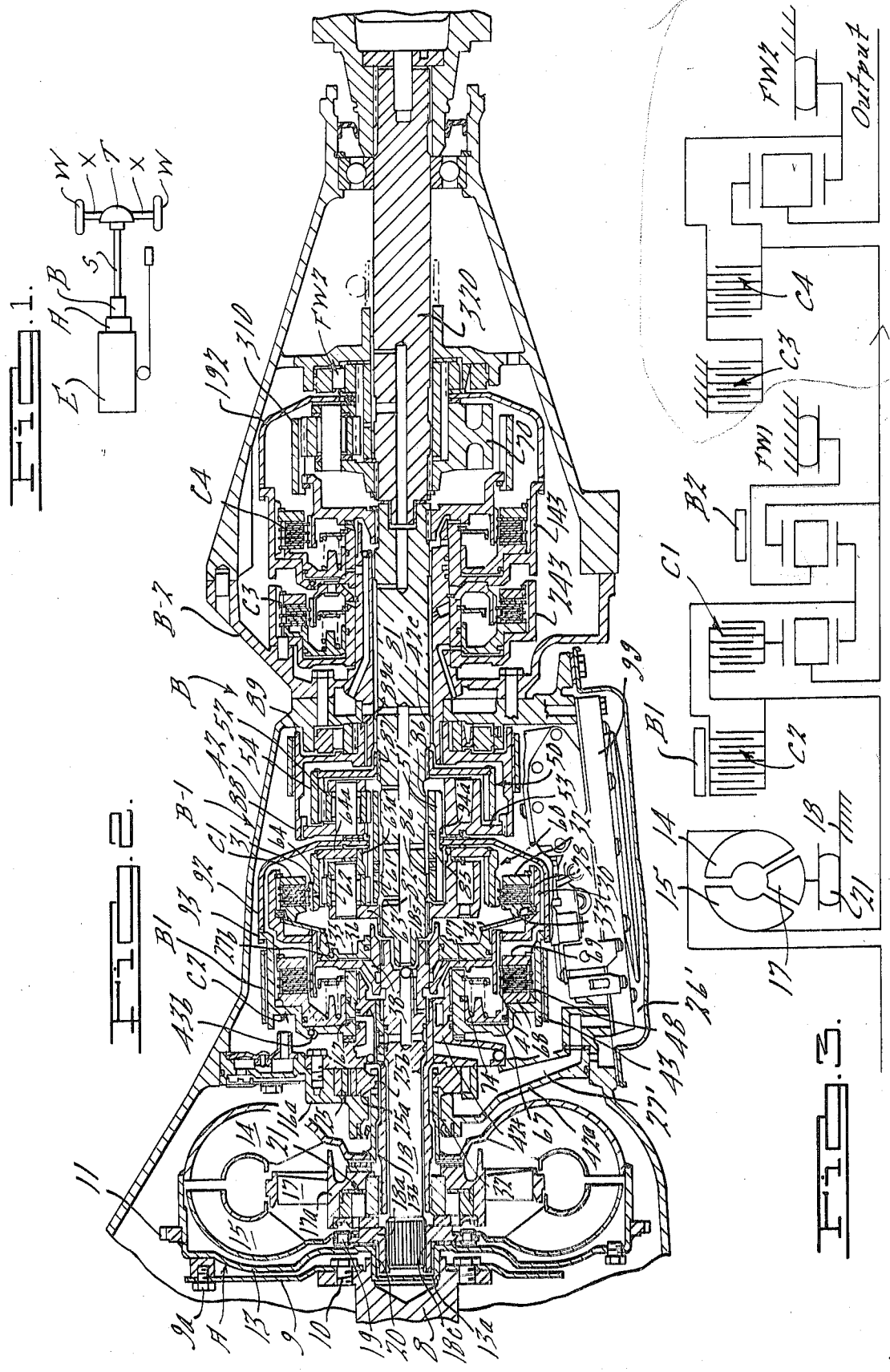

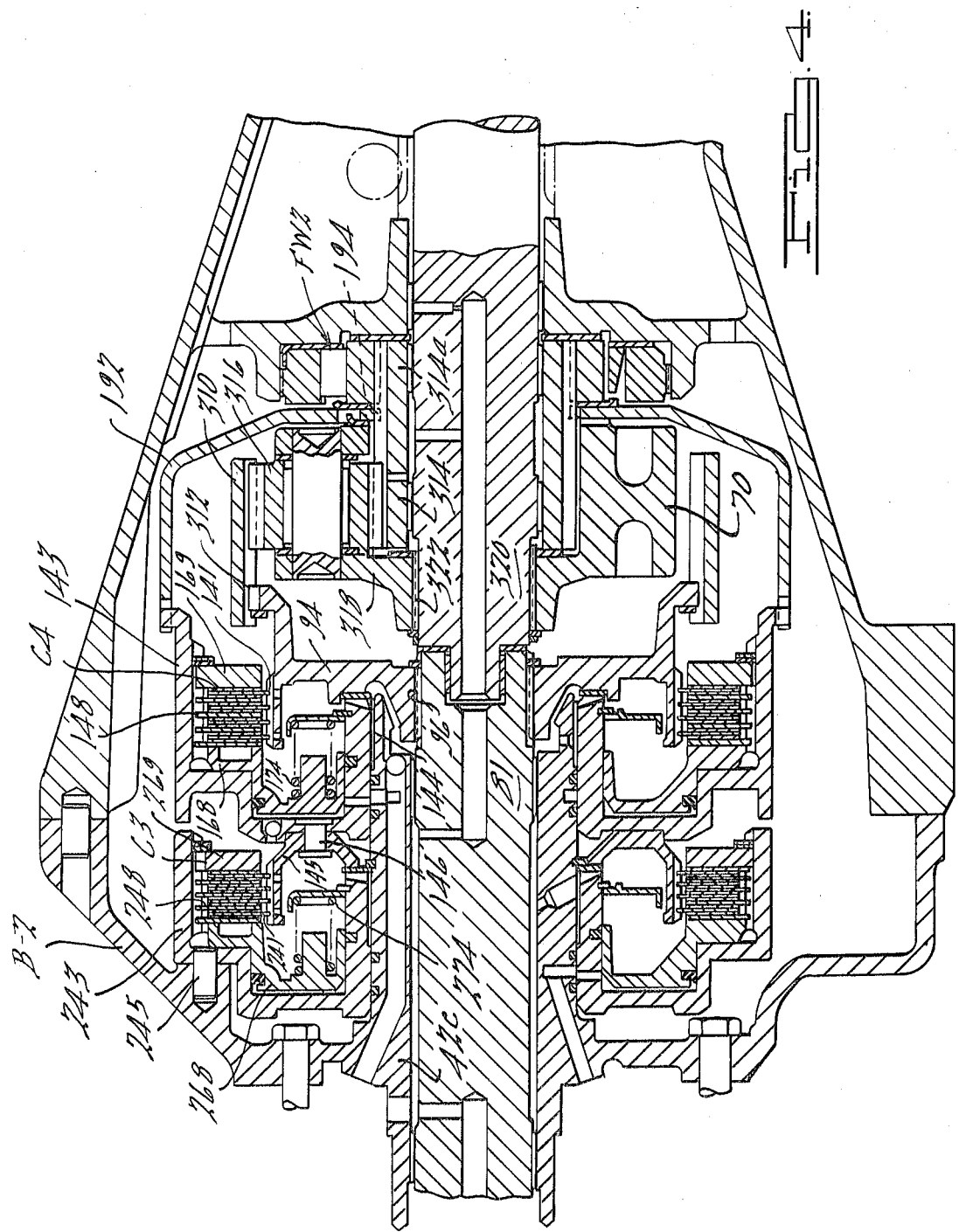

HYDRODYNAMIC TRANSMISSION

BACKGROUND OF THE INVENTION

This invention relates to a power transmission unit primarily intended for motor vehicle use and is particularly concerned with a transmission of the most simplified, compact type that will function to automatically provide four different forward drive speeds and also a reverse drive.

There are many types of four forward speed transmissions manufactured for and used in trucks. Many of these transmissions are extremely complicated. The present invention relates to an automatic four speed truck transmission which has advantages of many of the prior art four speed transmissions.

BRIEF SUMMARY OF THE INVENTION

Briefly, this invention comprises a transmission having four forward speed drives and a reverse drive which is particularly useful in trucks.

It is a primary object of this invention to provide a four forward speeds and reverse drive motor vehicle transmission that utilizes the minimum number and the least complicated transmission elements with said elements arranged in a novel compact manner so as to provide the most favorable construction for a forwardly positioned transmission in a motor vehicle having the minimum road clearance and the minimum allowance for a drive shaft tunnel in the vehicle body floor.

It is another object of this invention to provide a simplified four forward speeds and reverse drive transmission adapted for automatic and manual control that utilizes three simple planetary gear sets in combination with two one-way brakes and four friction clutches and a hydraulic torque converter.

It is still another object of this invention to provide a power transmission unit of the aforementioned type wherein portions of the gearing are nested concentrically within at least one of the friction clutch assemblies to permit reduction in over-all length of the power transmission unit.

It is still another object of this invention to arrange the elements of the planetary gear trains such that bearing and thrust loads will be reduced to a minimum and thereby achieve the maximum simplicity and economy of parts.

It is still another object of this invention to provide a four forward speeds and reverse drive motor vehicle transmission in which certain of the components utilized to achieve the fourth speed are identical in shape to certain elements used in achieving the first three forward speeds, thereby reducing the tooling requirements and facilitating the stockpiling and ordering of parts for servicing the transmission.

Other objects and advantages of this invention will become readily apparent from a consideration of the subsequent description and the related drawings.

BRIEF DESCRIPTION OF THE DRAWINGS

FIG. 1 is a schematic view of a motor vehicle drive train that includes a power transmission unit embodying this invention;

FIG. 2 is a sectional elevational view of the power transmission unit utilized in the disclosed drive train of FIG. 1;

FIG. 3 is a schematic line diagram of the power transmission unit shown in FIG. 2; and FIG. 4 is an enlarged, fragmentary, elevational view of the power transmission unit shown in FIG. 2.

Like parts are shown by corresponding reference characters throughout the several views.

DESCRIPTION OF THE PREFERRED EMBODIMENT

FIG. 1 of the drawings diagrammatically discloses a motor vehicle power plant and drive train comprising an internal combustion engine E drivingly connected to a power transmission unit that consists of the hydrokinetic type of torque converter device A drivingly connected to a two-piece change speed gear box B. The output from gear box B drives a propeller shaft or drive shaft S that transmits drive through a differential unit T and axles X to the rear driving wheels W of the vehicle.

FIG. 2 of the drawings discloses the power transmission unit structure that consists of the expanded hydrokinetic torque converer device A and the two-piece change speed gear box B that are arranged in a series connected drive transmitting relationship. the reference numeral 8 represents an end portion of a driving member, such as the crankshaft of the engine E of the motor vehicle power plant. The shaft 8 is drivingly connected to the drive transmitting ring 9 by the screw means 10. The drive transmitting ring 9 is drivingly connected by bolts 9a to the torque converter casing 13. The converter casing 13 has an engine starter ring gear 11 mounted on and extending about its periphery. Within the torque converter casing 13 are mounted the several vaned converter wheel elements, namely, the impeller or pump member 14, the turbine or runner member 15, and the guide or reaction member 17. A pair of guide wheels may be used in place of the single guide wheel 17.

The vaned impeller wheel 14 is formed as an integral part of the converter casing 13 and is accordingly adapted to be rotatably driven by the driving shaft 8. The vaned turbine wheel 15 is drivingly connected by rivet means 19 to a radially extending flange portion formed on the shaft hub member 18a of shaft 18. Shaft hub member 18a is drivingly connected by splines 18c to the forward end portion of the torque converter driven shaft member 18.

By the use of an expanded torque converter A, wherein the rotor wheel vane portions are positioned radially outwardly at increased radial distances, it has been found that the same amount of torque conversion and multiplication can be obtained with a smaller size wheel blade portion as is obtained with a much larger size rotor wheel blade protion that is located closer to the rotational axis of the rotor wheels. Because smaller size rotor wheel blading can be used with an expanded converter, the axial length of the converter A can be materially reduced and thus the over-all length of the transmission unit is shortened. Furthermore, with an expanded converter the one-way brake device 21 for the converter stator wheel 17 as well as the housing 16a for the engine-driven front pump 25 may be nested within the hub area of the expanded rotor wheels 14, 15, 17 and this permits a further axial shortening of the transmission power unit herein disclosed.

The converter driven shaft member 18 is adapted to transmit drive from the turbine member 15 of the torque converter device A to the planetary gearing of the gear box unit B that is arranged rearwardly of and in series with the torque converter device A. The converter driven shaft 18 thus provides the input shaft to the gear box B. The forward end of shaft 18 is journalled in a bearing 20 that is piloted in an axially extending seat 13a formed in the hub of the torque converter casing 13. The rear end portion of converter driven shaft 18 is rotatably supported by the sleeve 32 that is carried by the front wall 42a of the gear box housing 42.

The vaned converter guide wheel 17 is rotatably mounted within the converter casing 13 by means of the guide wheel hub portion 17a. Guide wheel hub portion 17a is supported by means of the one-way brake device 21, on the axially extending sleeve 32 of the housing portion plate 42a. The one-way brake 21 is arranged such that it will permit only forward rotary movement (clockwise when looking from the converter A toward the gear box B) to be transmitted to the guide wheel 17 by the forward rotation of the impeller 14. The brake 21 continuously prevents rotation of the guide wheel 17 in a reverse or counterclockwise direction.

The torque converter unit A includes a gear type oil pump 25 having a driving gear 25a that is directly connected by key means 25b to the rearwardly projecting end of an axially extending, sleevelike, flange portion 13b of the rotatable converter casing 13. The pump 25 draws oil from a supply sump 26' through conduit 27' and circulates this oil through the converter A, the transmission unit lubricating system and the various hydraulically operated control mechanisms associated with this power transmission unit (not shown).

The gear box B includes two sections B-1 and B-2. Section B-1 includes the forward drive clutch, $C_1$, the drive clutch $C_2$, and the pair of planetary gear trains 50 and 60. The section B-2 includes clutches $C_3$ and $C_4$ and planetary gear train 70. The clutches and planetary gear sets are adapted to cooperate with the torque converter device A to provide means for the transmission of four forward drives and a reverse drive to the propeller shaft S. The forward drive clutch $C_1$ is engaged whenever any of the four forward speeds is being utilized and it is disengaged when the transmission controls are set for either Neutral or Reverse. The drive clutch $C_2$ is engaged when the third or forward speed is being transmitted or when Reverse drive is being transmitted. The different clutches and brakes that are applied for transmitting the several drive ratios obtainable with this transmission are set forth in the chart below.

| Drive Ratio | Elements Used | |
|---|---|---|
| 1st | $C_1$ $FW_1/B_2$ | $FW_2/C_3$ |
| 2nd | $C_1$ $B_1$ | $FW_2/C_3$ |
| 3rd | $C_1$ $C_2$ | $FW_2/C_3$ |
| 4th (Direct) | $C_1$ $C_2$ | $C_4$ |
| Reverse | $C_2$ $B_2$ | $C_3$ |

The gear box section B-1 includes the housing 42 which may be considered to include front and rear portions. In the front portion of the housing 42 are located the clutches $C_1$ and $C_2$ whereas the rear portion houses the two planetary gear sets 50 and 60. The rear end of the converter driven gear box input shaft 18 pilots the forward end of the gear box transfer shaft 81. Shaft 81 has its rear end portion journalled in the sleeve portion 42c of the transmission housing B-2. Transmission input shaft is drivingly connected at 18s to a spider element 27. The spider element 27 carries the friction clutch disc elements 41 of the reverse and direct drive clutch $C_2$. Clutch discs 41 are adapted to be drivingly engaged with the clutch discs 48 that are drivingly connected to the interior surfaces of the brake drum 43. Brake drum 43 is journalled on the rearwardly projecting collar 42f on the gear box housing front wall 42a. A brake band $B_1$ is arranged to be selectively applied to the brake drum 43 to prevent rotation thereof. Brake drum 43 mounts a backing plate 69 that cooperates with an axially shiftable piston 68 to effect drive transmitting engagement of the clutch discs 41, 48. Springs 74 normally urge the piston 68 forwardly to clutch disengaged position. Brake drum 43 may include a ball check pressure fluid bleed valve 43b that is speed responsive and arranged to prevent unintended engagement of the clutch $C_2$ by the centrifugal action of any fluid that may be trapped in the piston bore 67. Pressure fluid for operation of the clutch $C_2$ is supplied to the piston bore 67 through the conduit 167 that is connected to a suitable fluid pressure control valve (not shown).

Also drivingly mounted on the spider 27, and extending rearwardly therefrom is a clutch drum 30. Clutch drum 30 has drivingly and shiftably mounted on its interior face the friction clutch discs 28. Clutch discs 28 are arranged to be drivingly engaged with the clutch discs 31 that are carried by the exterior surface of the annular gear 64 of the forwardly arranged planetary gear set 60. Clutch discs 28 and 31 are arranged to be drivingly compressed against the backing plate 32 by the pressure plate 33 that is actuated by the lever spring plate 34. Lever spring plate 34 is operated by the piston 35 that reciprocates in a cylinder bore 36 formed in the rear side of the spider 27. Pressure fluid is supplied to the cylinder bore 36 by way of the conduit 38 that is connected to a pressure fluid control valve not shown. The spider 27 may mount a pressure fluid ball check bleed valve 27b that will prevent unintended engagement of the clutch $C_1$ by centrifugal force action on any fluid that might be trapped in the cylinder bore 36.

Arranged concentrically within the forward drive clutch $C_1$ is the forwardly located planetary gear set 60. This gear set 60 comprises the annulus gear 64, the sun gear 61, the planet pinion gearing 62 connecting gears 61, 64, and the planet pinion gear carrier 63 that rotatably supports the pinion gearing. Pinion gearing carrier 63 is splined to the output shaft 81 at 82. Annulus gear 64 is supported through its radially extending plate portion 64a on a hub portion 63a of the planet pinion gear carrier 63. The sun gear 61 is an integral part of the double sun gear sleeve 85. Sleeve 85 has the sun gear 61 formed on the front end thereof and the sun gear 51 of planetary gear set 50 is formed on the rear end thereof. Sun gear sleeve 85 is journalled on the transfer shaft 81 by means of sleeve bearings 86.

The rearwardly located gear set 50 includes the sun gear 51, the annulus gear 54, the planet pinion gearing 52 that connects the gears 51, 54, and the planet pinion gear carrier 53 that rotatably supports the pinion gearing 52. Annulus gear 54 is drivingly connected to the transfer shaft 81 by the splines 87. Pinion gear carrier 53 is drivingly connected at 88 to a brake drum 89 that is adapted to be engaged by the brake band $B_2$. Brake drum 89 has a hub portion 89a that is journalled on the forwardly projecting collar 42c of the transmission housing B–2. Hub portion 89a of the annulus gear 89 is restrained against reverse rotation, counterclockwise when looking from the front towards the rear of the transmission, by means of the one-way brake device $FW_1$ which is similar to the brake device 21.

Interconnection between the two axially spaced adjacent gear sets 50, 60 is by way of the common sun gear sleeve 85 and by way of the dual connections of the front carrier 63 and the rear annulus gear 54 to the common transfer shaft 81.

It will be noted that a particularly compact, relatively short unit B–1 is provided because of the concentric arrangement of the front planetary gear set within the forward drive clutch $C_1$. Because of this concentric arrangement it is also possible to use a relatively short drum connector 92 between the front brake drum 43 and the sun gear sleeve 85. Connector drum 92 is splined to the drum 43 at 93 and to the sun gear sleeve 85 at 94a. Drum connector 92 is the means whereby the sun gears 51, 61 can be anchored against rotation when brake band $B_1$ is applied to brake drum 43.

Mounted on the rear end of transfer shaft 81 is a spider element 94 splined to the shaft at 96. Friction clutch disc elements 141 are carried by spider 94 and are adapted to be drivingly engaged with clutch discs 148 that are drivingly connected to the interior surfaces of a drum 143. Drum 143 mounts a backing plate 169 that cooperates with an axially shiftable piston 168 to effect drive transmitting engagement of the clutch discs 141 and 148. Springs 174 normally urge the piston 168 forwardly to clutch disengaged position. Drum 143 is rotatably mounted on collar 42c by bearings 144.

An annular carrier 145 is secured by a plurality of fasteners 146 to the forward side of the radially extending portion of drum 143. Friction clutch disc elements 241 are carried by carrier 145 and are adapted to be drivingly engaged with clutch discs 248 that are drivingly connected to the interior surfaces of a drum 243. Drum 243 mounts a backing plate 269 that cooperates with an axially shiftable piston 268 to effect engagement of the clutch disc 241 and 248. Drum 243 is secured by fasteners 245 to the housing portion B–2. Springs 274 normally urge the piston 268 forwardly to clutch disengaged position.

Spider element 94 is splined to an annulus gear 310 of planetary gear set 70 at 312. The gear set 70 comprises the annulus gear 310, a sun gear 314, planet pinion gearing 316 connecting gear 310, 314, and a planet pinion carrier 318 that rotatably supports the pinion gearing. Pinion gearing carrier 318 is splined to an output shaft 320 at 322. The forward end of output shaft 320 is piloted in the rearward end of transfer shaft 81.

Sun gear 314 has a rearwardly extending hub portion 314a which is restrained against reverse rotation, counterclockwise when looking from the front towards the rear of the transmission, by means of the one-way brake device $FW_2$. Output shaft 320 is connected at its rearward end to drive shaft S.

A connector drum 192 is splined to drum 143 at 193 and to sun gear 314 at 194.

It is thought to be obvious that the valve body 99 that includes the several fluid control mechanisms for this automatic type of four forward speeds and reverse drive transmission will be mounted in the transmission housing oil sump 26'. This location makes it easy to adjust, repair, or replace the valve body 99 and it also permits foreshortening of the transmission length.

With the aforedescribed gear box when the transmission is set in Neutral by means of control device (not shown), the hydraulic control system also not shown prevents the application of pressurized fluid to any of the clutches $C_1$, $C_2$, $C_3$ or $C_4$ or to either of the servos not shown that are used to apply the braking bands $B_1$ and $B_2$. When clutch $C_1$ is disengaged, the torque converter-driven gear box input shaft 18 is disconnected from the gear box gear set 60 so there can be no input to either of the gear sets 50, 60 through the sun gears 51, 61 of the gear sets. Accordingly, no drive will be transmitted to transfer shaft 81.

When the drive ratio device is set for the initiation of drive in the Drive range, the forward drive clutch $C_1$ is automatically engaged and this transmits drive to the gear box planetary input gear 64. Neither the braking band $B_1$ nor the clutch $C_2$ is engaged at this time. Band $B_2$ one-way clutch $FW_1$ is applied and prevents rotation of the carrier 53 at this time. The compounded gear sets 50 and 60 cooperate to transmit the one-way Low or first speed forward drive to the gear box transfer shaft 81. This Low speed drive passes from the input shaft 18 through the engaged clutch $C_1$ and then to the ring gear 64. Ring gear 64 acts on the planet pinion gears 63 and causes rotation of the sun gear 61 backwards because the load on the shaft 81 tends to anchor the planet pinion carrier 63 against rotation. Rotation of sun gear 61 backwards rotates the sleeve 85 and the sun gear 51 backwards. The sun gear 51 rotating backwards acts on the planet pinions 52. Due to the brake $B_2$ and brake device $FW_1$ the carrier 53 cannot be rotated backwards and the pinion gears 52 are then active to drive the ring gear 54 and connected shaft 81 forwardly. Due to the connection of both the carrier 63 and the ring gear 54 to the shaft 81 and due to the anchoring of carrier 53 by brake $FW_1$ at this time, part of the torque of the input shaft 18 is transmitted dirctly to the shaft 81 by the planetary gear set 60 and the other part of the input shaft torque is delivered to the shaft 81 through the compounded gear sets 50 and 60. Clutch $C_3$ or $FW_2$ is engaged and prevents rotation of sun gear 314. Transfer shaft 81 drives spider 94, annulus gear 310 which through pinions 316 drives pinion carrier 318. The latter is splined to output shaft 320. The starting Low drive when the transmission is set for Drive, or any other forward drive ratio for that matter, thus passes through the gear sets 50, 60 and 70 with the reaction normally provided by the one-way brake device $FW_1$ and/or $FW_2$.

When Second speed is to be attained by an upshift from the starting Low, it is merely necessary to apply brake $B_1$, thereby allowing FW to free wheel. Clutch $C_1$ and brake $B_1$ are engaged. The drive from transfer shaft 81 then passes through spider 94, annular gear 310, pinions 316, and carrier 318 to shaft 320. Downshifting from Second to Low is accomplished by engaging clutch $C_3$ and applying band $B_2$ while releasing band $B_1$.

Third forward speed is achieved by an upshift from Second that results in the release of brake band $B_1$ and the application of clutch $C_2$. Clutch $C_2$ causes the sun gear 85 to rotate at the same annular velocity as annulus gear 64. Transfer shaft 81 drives output shaft 320 in the same manner as in Second speed described above.

Fourth speed or Direct Drive is attained by releasing clutch $C_3$ or one-way brake $FW_2$ and applying clutch $C_4$. Gear set 70 is locked up as a result of the engaged condition of clutch $C_4$. Accordingly a direct 1:1 forward drive is attained.

Reverse drive is obtained by moving the selector device (not shown) to a Reverse position. This action engages clutches $C_2$ and $C_3$ and applies brake band $B_2$ while the clutch $C_1$ and the band $B_1$ are disengaged. Forward drive from input shaft 18 is applied to drum 92, and sun gears 61, 51. Pinion carrier 53 is held by the application of band $B_2$, and thus the pinion rotated by sun gear 51 causes the annulus gear 54 and transfer shaft 81 to rotate in a reverse direction. The engagement of clutch $C_3$ prevents the rotation of sun gear 314. Accordingly, the reverse rotation of transfer shaft 81 causes pinions 316 to rotate and walk in the same reverse direction around the sun gear. Such movement causes the pinion carrier 318 and output shaft 320 to move in this same reverse direction.

For a coasting low speed ratio, for use as a brake or for continuous low speed operation, the braking band $B_2$ and $C_3$ are applied at the same time.

For limiting the transmission to an automatic two-speed or three-speed operation the range selector (not shown) is placed in the Second or Third position, respectively. Placement of the selector on these positions will prevent the automatic controls from moving to a lower ratio, i.e., will prevent the transmission from attaining a third speed condition when the selector is in Second or will prevent the transmission from attaining a Fourth speed or direct drive condition when the selector is in Third position.

It will be noted that many of the components located in box B-2 are identical to many components in box B-1, or are at least derived from such components by machining or performing other modifying operations thereon. Examples of such interchangeability of parts may be found in the drums 43, 143 and 243, the pistons 68, 168 and 268, the springs 74, 174 and 274 and the reaction plates therefor, the clutch discs 41, 141, 241 and 48, 148 and 248, the drum connectors 92 and 192 and the one-way brakes $FW_1$ and $FW_2$. This interchangeability of parts reduces the cost of the transmission, and also reduces the number of parts which must be kept in stock for repairing such transmission. Moreover, the tooling requirements for manufacturing this transmission are reduced. Thus, in addition to providing an operative and efficient four forward speed and reverse transmission, certain economies are effected in its construction.

In view of the foregoing, it will be seen that the various objects and other advantages of this invention are attained.

Although only one embodiment of the invention has been disclosed and described, it is apparent that other embodiments and modifications of the invention are possible.

We claim:

1. A multi-speed power transmission for a vehicle comprising a housing having first and second sections, said first section being forward of said second section with respect to the front and rear of said vehicle, an input shaft in said first section, an output shaft in said second section, and a transfer shaft extending between said input and output shaft and being located in both said first and second sections, said shafts having axes of rotation which extend longitudinally with respect to said vehicle, first and second axially spaced clutch devices each having first and second sets of friction clutch portions, a clutch spider element carried by said input shaft, a drum portion connected to said spider element and mounting said first set of said friction clutch portions of said first clutch device of said axially spaced first and second clutch devices, said spider element mounting said first set of said friction clutch portions of said second clutch device, first and second axially spaced planetary gear sets mounted on and anchored against axial shift along said transfer shaft, said first gear set being the forwardmost of said gear sets with respect to said vehicle, the second gear set being the rearmost of said gear sets with respect to said vehicle, each gear set including concentrically arranged, rotatable, intermeshed sun, ring, and planet pinion gears wherein the planet gears are rotatably mounted on a planet pinion gear carrier, the forwardmost of said gear sets having said second set of said friction clutch portions of said first clutch device on the periphery of its ring gear engageable with said first set of said friction clutch portions of said first clutch device, a first brake means arranged to anchor the carrier of the rearmost gear set against rotation, means drivingly interconnecting the sun gears of the two gear sets, means drivingly connecting the carrier of the forwardmost gear set and the ring gear of the rearmost gear set to said transfer shaft, a first one-way brake located between said first section of said housing and said carrier of the rearmost gear set, a mounting means mounting said second set of said friction clutch portions of said second clutch device in engageable relationship with the spider mounted first set of friction clutch portions of said second clutch device, a second brake means arranged to anchor said mounting means against rotation, said mounting means having drive transmitting portions connected to the sun gears of the planetary gear sets and being adapted to anchor said sun gears against rotation, a second clutch spider carried by said transfer shaft and located in said second section, a third clutch device having first and second sets of friction clutch portions, said second clutch spider mounting said first set of said friction clutch portions of said third clutch device, a third planetary gear set in said second section and including concentrically arranged rotatable, intermeshed, sun, ring and planet pinion gears wherein the pinion gears are rotatably mounted on a planet pinion gear carrier, the ring gear of said third planetary set being connected to said second clutch spider for rotation therewith, a clutch-brake device, having means drivingly connected to said sun gear of said third planetary set, said clutch-brake device being adapted to anchor said sun gear of said third planetary set against rotation, said means of said clutch-brake device mounting said second set of said friction-clutch portions of said third clutch device, said second set of said friction clutch portions of said third clutch device being engageable with said first set of friction clutch portions of said third clutch device, and a second one-way brake located between the sun gear of said third gear set and said second section of said housing, said first clutch device, said clutch-brake device and said first brake means, when engaged, providing a first forward drive ratio, said first clutch device, said clutch-brake device and said second brake means, when engaged, providing a second forward drive ratio, said first and second clutch devices, and said clutch-brake device, when engaged, providing a third forward drive ratio, said first, second and third clutch devices, when engaged, providing a fourth forward direct drive ratio, said mounting means, said third clutch device and said clutch brake device each having a drum portion, said drum portion of said mounting means and said third clutch device being substantially identical, said drum portion of said third clutch device differing from said drum portion of said mounting means in that the former has a radial portion with fastener openings therein while the latter has a radial portion with no fastener openings, said drum portions of said clutch-brake device, said mounting means and said third clutch device all being formed from identical original components, said drum portion of said clutch-brake device having a peripheral portion differing from the peripheral portions of the drum portions of said mounting means and said third clutch device in that forward and rearward portions of the original component from which the drum portion of said clutch-brake is derived are removed.

2. A multi-speed power transmission for a vehicle comprising a housing having first and second sections joined together, said first section being forward of said second section with respect to the front and rear of said vehicle, an input shaft rotatable in said first section, an output shaft rotatable in said second section, and a transfer shaft extending between said input and output shaft and being located in both said first and second sections, said shafts having axes of rotation which extend longitudinally with respect to said vehicle, first and second axially spaced clutch devices each having first and second sets of friction clutch portions, a clutch spider element carried by said input shaft, a drum portion connected to said spider element and mounting said first set of said friction clutch portions of said first clutch device of said axially spaced first and second clutch devices, said spider element mounting said first set of said friction clutch portions of said second clutch device, first and second axially spaced planetary gear sets mounted on and anchored against axial shift along said transfer shaft, said first gear set being the forwardmost of said gear sets with respect to said vehicle, the second gear set being the rearmost of said gear sets with respect to said vehicle, each gear set including concentrically arranged, rotatable, intermeshed, sun, ring and planet pinion gears wherein the planet gears are rotatably mounted on a planet pinion gear carrier, the forwardmost of said gear sets having said second set of said friction clutch portions of said first clutch device on the periphery of its ring gear engageable with said first set of said friction clutch portions of said first clutch device, a first brake means arranged to anchor the carrier of the rearmost gear set against rotation, means drivingly interconnecting the sun gears of the two gear sets, means drivingly connecting the carrier of the forwardmost gear set and the ring gear of the rearmost gear set to the transfer shaft, a first one-way brake located between said first section of said housing and said carrier of the rearmost gear set, a mounting means mounting said second set of said friction clutch portions of said second clutch device in engageable relationship with the spider mounted first set of friction clutch portions of the said second clutch device, a second brake means arranged to anchor said mounting means against rotation, said mounting means having drive transmitting portions connected to the sun gears of the planetary gear sets and being adapted to anchor said sun gears against rotation, a second clutch spider carried by said transfer shaft and located in said second section, a third clutch device having first and second sets of friction clutch portions, said second clutch spider mounting said first set of said friction clutch portions of said third clutch device, a third planetary gear set in said second section and including concentrically arranged rotatable, intermeshed sun, ring and planet pinion gears wherein the pinion gears are rotatably mounted on a planet pinion gear carrier, the ring gear of said third planetary set being connected to said second clutch spider for rotation therewith, a clutch-brake device, having means drivingly connected to said sun gear of said third planetary set, said clutch-brake device having first and second sets of friction clutch portions and being adapted to anchor said sun gear of said third planetary set against rotation, said first set of friction clutch portions of said clutch-brake device being slideable relative to said second section of said housing, said means of said clutch-brake device mounting said second set of said friction clutch portions of said third clutch device, said second set of said friction clutch portions of said third clutch device being engageable with said first set of friction clutch portions of said third clutch device, and a second one-way brake located between the sun gear of said third gear set and said second section of said housing, said first clutch device, said clutch-brake device and said first brake means, when engaged, providing a first forward drive ratio, said first clutch device, said clutch-brake device and said second brake means, when engaged, providing a second forward drive ratio, said first and second clutch devices, and said clutch-brake device, when engaged, providing a third forward drive ratio, said first, second and third clutch devices, when engaged, providing a fourth forward direct drive ratio, said mounting means, said third clutch device and said clutch-brake device each having a drum portion, said means of said clutch-brake device including an annular carrier, and said drum portion of said third clutch device, said second set of said friction clutch portions of said clutch-brake device being slideably mounted on said annular carrier, a plurality of fasteners extending through and connecting together said annular carrier and said drum portion of said third clutch device, said drum portions of said mounting means and said third clutch device being substantially identical, said drum portion of said third clutch device differing from said drum portion of said mounting means in that the former has a radial portion with fastener openings therein while the latter has a radial portion with no fastener openings, said drum portions of said clutch-brake device, said mounting means and said third clutch device all being formed from identical original components, said drum portion of said clutch-brake device having a peripheral portion differing from the peripheral portions of the drum portions of said mounting means and said third clutch device in that forward and rearward portions of the original component from which said drum portion of said clutch-brake device is derived are removed therefrom, said means of said clutch-brake device drivingly connected to said sun gear of said third planetary gear set and said drive transmitting portions of said mounting means each including a bowl-shaped connector formed from identical original components.

* * * * *